United States Patent
Tanner (10) Patent No.: US 10,224,669 B1
(45) Date of Patent: Mar. 5, 2019

(54) MULTI-PIECE HOUSING FOR SUBMERSIBLE PUMP ELECTRICAL CONNECTOR

(71) Applicant: Baker Hughes, a GE Company, LLC, Houston, TX (US)

(72) Inventor: David Tanner, Claremore, OK (US)

(73) Assignee: Baker Hughes, a GE Company, LLC, Houston, TX (US)

( * ) Notice: Subject to any disclaimer, the term of this patent is extended or adjusted under 35 U.S.C. 154(b) by 0 days.

(21) Appl. No.: 15/834,592

(22) Filed: Dec. 7, 2017

(51) Int. Cl.
| | |
|---|---|
| H02K 5/22 | (2006.01) |
| H01R 13/04 | (2006.01) |
| H01R 13/40 | (2006.01) |
| H02K 5/132 | (2006.01) |
| H01R 13/506 | (2006.01) |
| H01R 13/523 | (2006.01) |

(52) U.S. Cl.
CPC ........... *H01R 13/523* (2013.01); *H01R 13/04* (2013.01); *H01R 13/40* (2013.01); *H01R 13/506* (2013.01); *H02K 5/132* (2013.01); *H02K 5/225* (2013.01); *H01R 2201/10* (2013.01)

(58) Field of Classification Search
CPC .. E21B 17/023; E21B 17/028; E21B 33/0385; E21B 43/128; F16L 25/01; F16L 53/007; H01R 13/5205; H01R 13/521; H01R 13/5221; H01R 13/5208; H01R 13/005; H01R 13/523; H01R 13/40; H01R 13/506; H01R 13/04; H02K 5/225
USPC ................. 439/589, 279, 274, 275, 190–195
See application file for complete search history.

(56) References Cited

U.S. PATENT DOCUMENTS

| | | | | |
|---|---|---|---|---|
| 5,700,161 | A * | 12/1997 | Plummer | E21B 17/028 |
| | | | | 439/192 |
| 6,361,342 | B1 * | 3/2002 | Cox | H01R 13/5205 |
| | | | | 277/615 |
| 6,443,780 | B2 * | 9/2002 | Wilbourn | H01R 13/5202 |
| | | | | 439/738 |
| 6,676,366 | B2 | 1/2004 | Kao | |
| 6,676,447 | B1 * | 1/2004 | Knox | H01R 13/523 |
| | | | | 439/274 |
| 6,780,037 | B1 | 8/2004 | Parmeter et al. | |
| 7,229,325 | B1 * | 6/2007 | Flynn | H01R 9/223 |
| | | | | 439/798 |

(Continued)

OTHER PUBLICATIONS

Ryan Semple et al., "Direct Conductor Seal for Submersible Pump Electrical Connector," U.S. Appl. No. 15/727,319, filed Oct. 6, 2017.

*Primary Examiner* — Gary F Paumen
(74) *Attorney, Agent, or Firm* — Bracewell LLP; James E. Bradley (57) ABSTRACT

An electrical connector for a submersible well pump motor has a lower housing with upward protruding bosses. The bosses have parallel axes and a passage. An electrical line extends through each of the passages, each of the electrical lines having a lead sheath. A lead tape wrap is wrapped around an external side wall each of the bosses and a portion of the lead sheath of one of the electrical lines. An upper housing has first and second members that fit on opposite sides of the electrical lines and lower ends that connect to the lower housing. The first and second members have recesses that mate to define cavities, each of the cavities receiving one of the lead tape wraps. A fastener clamps the first and second members of the upper housing together.

19 Claims, 4 Drawing Sheets

(56) References Cited

U.S. PATENT DOCUMENTS

| | | | |
|---|---|---|---|
| 7,789,689 B2* | 9/2010 | Frey | H01R 13/523 |
| | | | 439/275 |
| 8,512,074 B2* | 8/2013 | Frey | H01R 13/523 |
| | | | 439/279 |
| 9,458,705 B2 | 10/2016 | Semple et al. | |
| 9,709,043 B2* | 7/2017 | Gilmore | F04B 17/03 |
| 2009/0269956 A1* | 10/2009 | Frey | H01R 13/523 |
| | | | 439/275 |
| 2012/0100737 A1* | 4/2012 | Frey | H01R 13/523 |
| | | | 439/271 |
| 2012/0312528 A1* | 12/2012 | Rayssiguier | E21B 17/026 |
| | | | 166/244.1 |
| 2016/0208806 A1 | 7/2016 | Knapp | |
| 2018/0090874 A1* | 3/2018 | Frey | H01R 13/523 |

* cited by examiner

MULTI-PIECE HOUSING FOR SUBMERSIBLE PUMP ELECTRICAL CONNECTOR

FIELD OF THE DISCLOSURE

This disclosure relates in general to power cable connectors for electrical submersible well pumps, and in particular to a connector that has a multi-piece housing.

BACKGROUND

Electrical submersible well pumps (ESP) are often used to pump liquids from hydrocarbon producing wells. A typical ESP includes a pump driven by an electrical motor. Production tubing, which comprises pipes having threaded ends secured together, supports the ESP in most installations. The pump normally pumps well fluid into the production tubing. A power cable extends alongside the production tubing to the motor for supplying power.

In one type of ESP, the power cable normally has on a lower end a splice that connects it to a motor lead. The motor lead extends alongside the ESP and has a motor connector or pothead on its lower end that connects to an upper end of the motor to supply power. The motor lead may have three insulated conductors bundled together, one for each phase of power being supplied. An outer armor strip wraps around the three insulated conductors. Some power cables have lead sheaths around each insulated conductor to resist damage from hydrogen sulfide that may be produced in the well.

A variety of motor connectors are known. In most types, each of the three power conductors extends into a housing and joins a motor wire. Various insulator arrangements electrically insulate the terminals of the conductors and motor wire. In addition, an epoxy filler may be dispensed around the power conductors in the housing.

SUMMARY

An electrical connector for a submersible well pump motor includes a lower housing having a lower end for securing to the motor. The lower housing has upward protruding bosses. The bosses have axes that are parallel with each other that are located in a single plane. Each of the bosses has an annular external side wall. A passage extends through each of the bosses. An electrical line extends through each of the passages. An isolation boot seals around the external side wall of each of the bosses and a portion of each of the electrical lines. Each of the isolation boots seals one of the electrical lines to one of the bosses. An upper housing secures to the lower housing, the upper housing having an interior containing the isolation boots.

The upper housing may have first and second members that clamp around the electrical lines, each of the first and second members having recesses. The recesses of the first member mate with the recesses of the second member to define cavities within the interior of the upper housing. Each of the cavities receives one of the isolation boots and a portion of one of the electrical lines.

A groove and rib arrangement on lower ends of the first and second members and along an upper end of the lower housing connect the first and second members to the lower housing.

A metal armor strip wraps around the electric lines. The upper housing has an oblong upper opening defined by the first and second members of the upper housing that clamps around and frictionally engages the armor strip when the first and second members are clamped together.

In the embodiment shown, each of the first and second members has an interior face, the interior faces facing each other when the first and second members are clamped together. The recesses of the first member are formed in the interior face of the first member, and the recesses of the second member are formed in the interior face of the second member. Each of the recesses of the first and second members is semi-circular when viewed in a transverse cross-section perpendicular to the axes of the bosses.

The isolation boot may comprise a tape wrapped around each of the bosses. Each electrical line may have a lead sheath. The tape may be formed of lead and wrapped around each of the bosses and a portion of each of the lead sheaths.

DETAILED DESCRIPTION OF THE DISCLOSURE

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Figure 1:
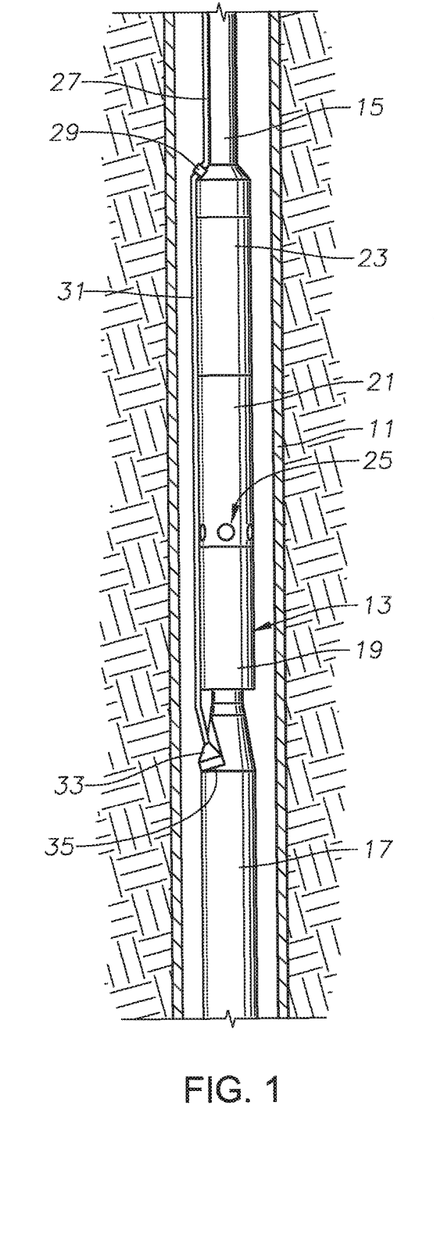
FIG. 1 is a schematic side view of an electrical submersible pump suspended in a well and having an electrical motor connector in accordance with this invention.

FIG. 1 is an elevational section view of a cased well 11 having downhole equipment comprising an electrical submersible pumping system (ESP) 13, which is disposed on a string of production tubing 15. ESP 13 includes an electric motor 17, a seal/equalizer section 19, an optional gas separator 21, and a pump 23. Motor 17 is normally a three-phase AC type. Pump 23 may comprise a centrifugal pump or another type, such as a progressing cavity pump. Fluid inlets 25 on separator 21 provide a passage for receiving fluid into pump 23. If a gas separator is not used, fluid inlets 25 would be at the lower end of pump 23.

A power cable 27 extends downhole alongside tubing 15, terminating in a splice or connection 29 that electrically couples power cable 27 to a motor lead 31, which may be considered to be part of power cable 27. Motor lead 31 has a motor connector 33 on its lower end that electrically connects and secures motor lead 31 to a receptacle 35 of electric motor 17. Alternately, power cable 27 can extend all the way from the surface to motor connector 33, thereby eliminating the need for cable connection 29.

Figure 2:
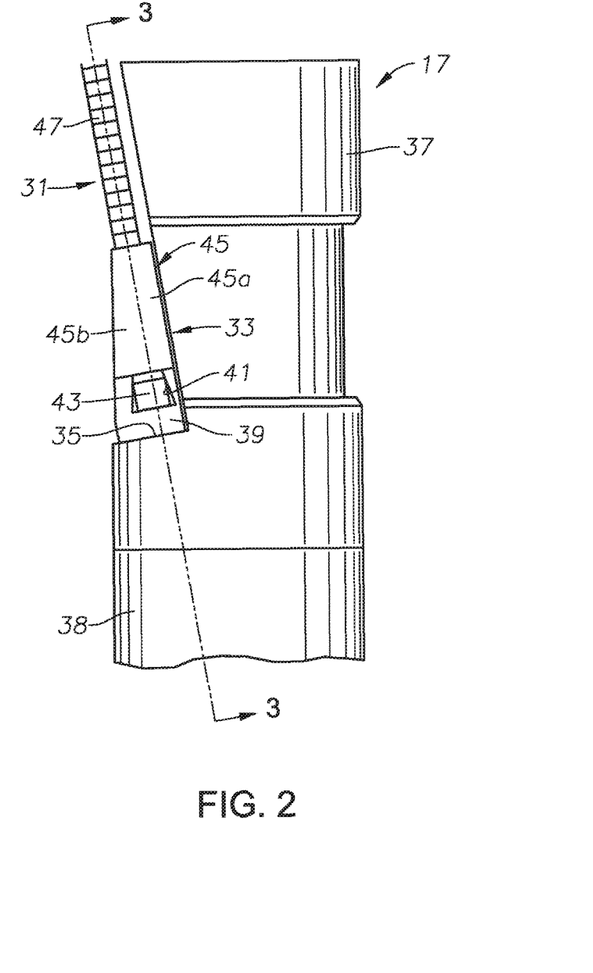
FIG. 2 is an enlarged side view of the motor connector connected to the head of the motor.

Referring to FIG. 2, receptacle base 35 is formed on a head 37 of motor 17. Head 37 secures by threads to a housing 38 of motor 17. In this example, receptacle base 35 is a flat surface facing upward and slightly tilted relative to a longitudinal axis of head 37. The terms "upward", "downward", "upper", "lower" and the like are used only for convenience because ESP 13 may be installed in inclined portions of cased well 11 that may be horizontal.

Connector 33 has a lower housing 39 with a flange having slots 41 on opposite sides for receiving bolts 43. Bolts 43 engage threaded holes in head 37, securing connector 33 to motor 17. Connector 33 also has an upper housing 45, which in this example comprises first and second members 45a, 45b clamped around motor lead 31. Upper housing 45 secures to lower housing 39.

Figure 3:
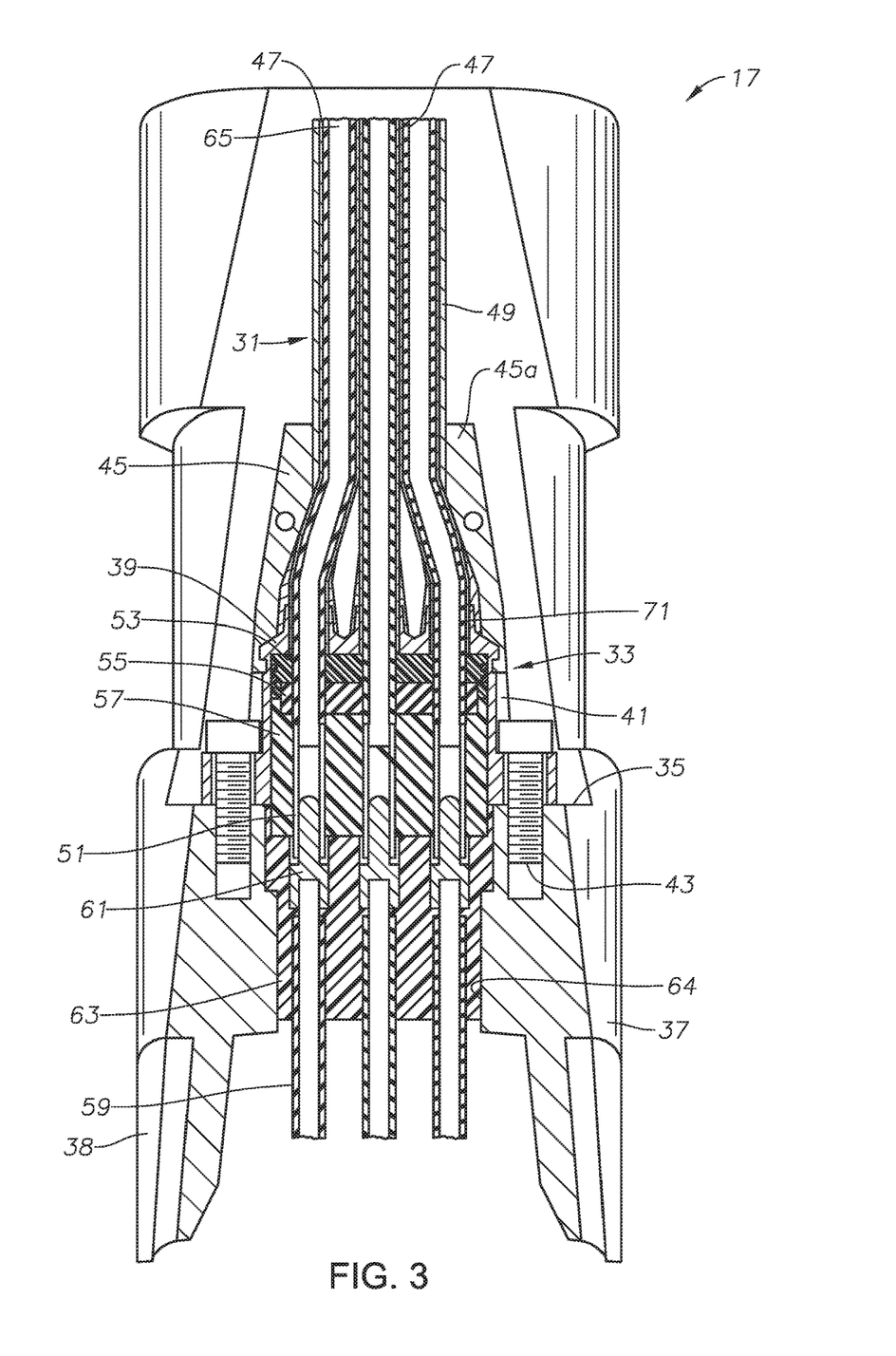
FIG. 3 is a sectional view of connector of FIG. 2, taken along the line 3-3 of FIG. 2.

Referring to FIG. 3, motor lead 31 has three electrical lines 47 for supplying power to the three phases of motor 17. Electrical lines 47 within motor lead 31 are located side-by-side with their centerlines in a single plane. An armor 49 comprising a strip of metal wraps helically around the assembled electrical lines 47. Each electrical line 47 has a conventional electrical connector terminal 51 on a lower end. Terminals 51 may be electrically insulated in a variety of ways. In this example, terminals 51 are insulated by an upper insulator block 53, an elastomeric seal block 55 and a lower insulator block 57. Electrical lines 47 extend into holes provided in upper insulator block 53, seal block 55 and lower insulator block 57.

Motor wires 59 extend upward from the interior of motor 17 and have electrical terminals 61 on their upper ends that engage electrical line terminals 51. In this example, motor wire terminals 61 are pins and electrical line terminals 51 are sleeves, but that arrangement could be reversed. Motor wires 59 extend through holes in a head insulator 63. Head insulator 63 mounts within an opening 64 in motor head 37.

Figure 4:
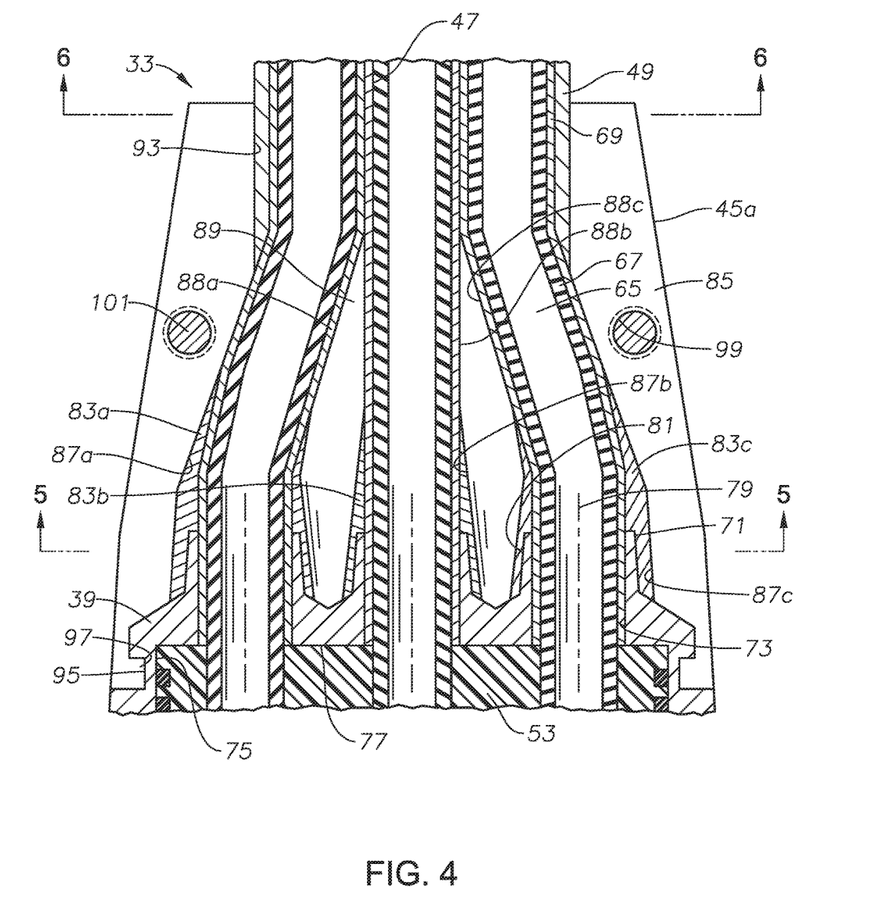
FIG. 4 is an enlarged sectional view of part of the electrical connector of FIG. 3, taken along the line 4-4 of FIG. 5.

Referring to FIG. 4, each electrical line 47 comprises a copper conductor 65 surrounded by one or more electrical insulation layers 67. In this embodiment, a lead sheath 69 encases each insulation layer 67. Lead sheath 69 blocks hydrogen sulfide, which is produced in some wells, from detrimental contact with insulation layer 67. Lead sheaths 69 of adjacent electrical lines 47 may touch each while assembled side-by-side within motor lead 31 and wrapped with armor 49. Armor 49 extends a selected distance downward into upper housing 45. Electrical lines 47 spread laterally apart from each other as they extend below armor 49 into a lower part of upper housing 45.

Lower housing 39 is a single-piece member with three upward extending protuberances, referred to herein as bosses 71. Each boss 71 has a passage 73 through it that receives one of the electrical lines 47. Each passage 73 extends from the upper end of one of the bosses 71 downward to an insulation chamber 75. Insulation chamber 75 has a downward facing wall 77 and contains the insulators for terminals 51, which in this instance comprises upper insulator block 53, seal block 55 and lower insulator block 57, as shown in FIG. 3. Each passage 73 has a lower end at insulation chamber wall 77. Conductors 65 and insulation layers 67 of electrical lines 47 protrude into insulation chamber 75, but the lead sheaths 69 may have lower ends at insulation chamber wall 77, as shown.

Each boss 71 has an axis 79, and axes 79 are parallel to each other and located in a single plane. Each boss 71 has an annular exterior side wall 81, which may conical, as shown. The diameter of exterior side wall 81 may be smaller at the upper end than at the lower end of each boss 71. Exterior side walls 81 are spaced laterally apart from each other in the plane containing axes 79.

Lead tape wraps 83a, 83b and 83c, which may also be referred to as isolation boots, seal each electrical line 47 to one of the bosses 71. Each lead tape wrap 83 is made by wrapping a thin tape or foil of lead helically around exterior side wall 81 of each boss 71 and a portion of the lead sheath 69 on each electrical line 47. Each turn of the lead tape of each lead tape wrap 83a, 83b, 83c is overlapped to form a fluid tight seal where lead sheath 69 enters passage 73. The lead tape forming lead tape wraps 83a, 83b, 83c may be conventional and may not require an adhesive layer to cause the overlapping strips of tape to self-seal to each other. One material property of lead is that it will bond to itself, or that it is highly cohesive Each of the three lead tape wraps 83a, 83b, 83c extends upward from the base of one of the bosses 71 a selected distance around one of the lead sheaths 69. The lead tape wraps 83a, 83b, 83c will self-seal to the lead sheaths 69, as well.

The central lead tape wrap 83b has a straight conical exterior surface from its lower end to its upper end. Each of the lateral or outer lead tape wraps 83a, 83c also has conical exterior surfaces, but the conical form has a lower portion that extends and joins an inwardly inclined portion. The inclined portions of lead tape wraps 83a, 83c incline toward central lead tape wrap 83b because of the inclined portions of the two outer electrical wires 47. These inclined portions of the two outer electrical wires join the axial portions extending through bosses 83a, 83c with the axial portions within armor 49. Lead tape wraps 83a, 83b, 83c do not touch each other in this example. A technician will make lead tape wraps 83a, 83b, 83c before attaching upper housing members 45a, 45b to lower housing 39.

FIG. 4 illustrates the interior side of upper housing first member 45a; upper housing second member 45b will have the same features because the interior sides are mirror images of each other. Each first and second member 45a, 45b has an interior face 85 that is a flat surface in a plane parallel to the plane containing axes 79. Each interior face 85 has three laterally spaced apart channels or recesses 87a, 87b and 87c formed in it. Each recess 87a, 87b and 87c has a lower portion configured as a tapered channel to closely receive half of one of the lead tape wraps 83a, 83b, 83c. Recess 87b is the middle recess, and when viewed in a plan view as in the example of FIG. 4, it has a tapered lower portion to match the contour of central lead tape wrap 83b. Lateral recesses 87a and 87b have tapered lower portions that match the contours of lateral lead tape wraps 83a, 83c. Each recess 87a, 87b, 87c has an upper portion 88a, 88b, 88c that is a semi-cylindrical channel that closely receives a portion of each electrical line 47 above lead tape wraps 83a, 83b, 83c.

Interior face 85 has two ridge portions 89 that are flat and in the same plane as the remainder of interior face 85. One ridge portion 89 is between recesses 87a and 87b, and the other is between recesses 87b and 87c. One ridge portion 89 separates outer lead tape wrap 83a from central lead tape wrap 83b. The other ridge portion 89 separates outer lead tape wrap 83c from central lead tape wrap 83b. The upper parts of ridge portions 89 separate recess upper portions 88a, 88b, 88c from each other.

Figure 5:
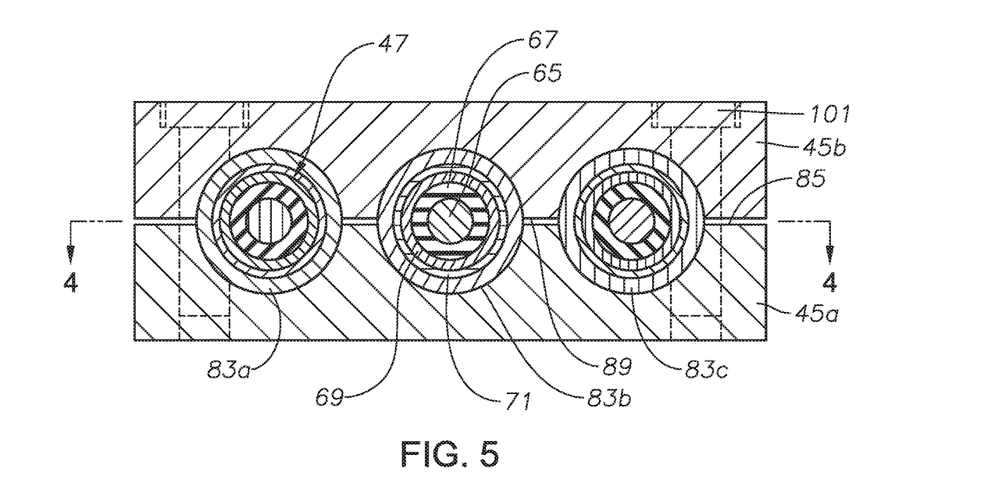
FIG. 5 is a sectional view of part of the electrical connector of FIG. 3, taken along the line 5-5 of FIG. 4.

Each recess 87a, 87b, 87c, including its upper portion 88a, 88b, 88c, is semi-circular when viewed in the transverse section plane of FIG. 5. Recesses 87a, 87b, 87c in first member 45a mate with recesses 87a, 87b, 87c of second member 45b to define cavities that are circular in the transverse section plane of FIG. 5. The cavities defined by the lower portions of mating recesses 87a, 87b, 87c are conical. The cavities defined by the upper portions 88a, 88b, 88c of the mating recesses are cylindrical. The lower portions of the mating recesses 87a, 87b, 87c of first member 45a and second member 45b surround and contact the entire surfaces of lead tape wraps 83a, 83b, 83c, respectively. The semi-cylindrical upper portions 88a, 88b, 88c of the recesses define cylindrical cavities that surround and contact the entire exterior surfaces of an upper portion of electrical lines 47 extending from lead tape wraps 87a, 83b, 83c. The restraining contact provided by recesses 87a, 87b, 87c and their upper portions 88a, 88b, 88c mitigates against explosive expansion of insulation layers 67, which could otherwise occur due to a rapid pressure decrease as ESP 13 is being retrieved.

Figure 6:
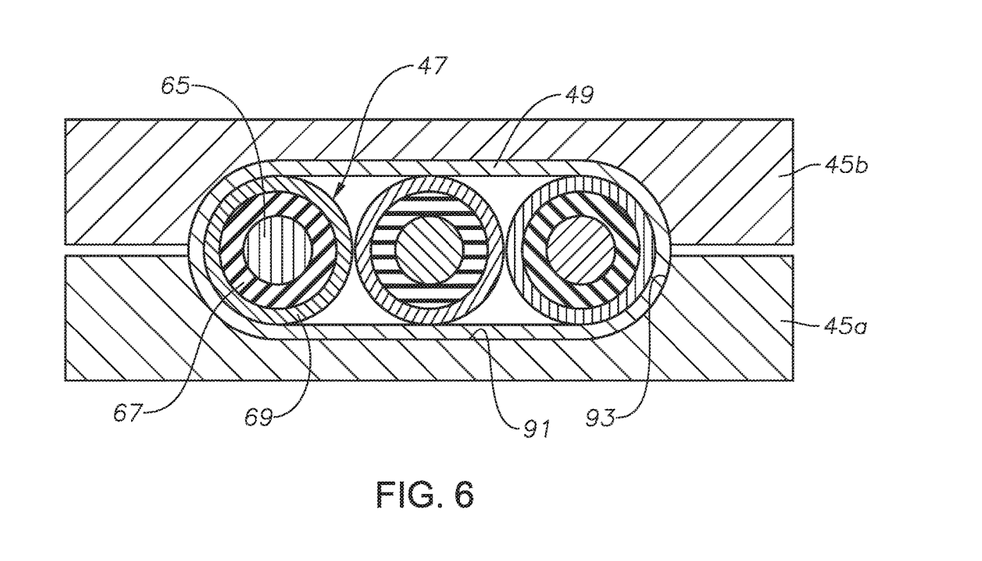
FIG. 6 is a sectional view of part of the electrical connector of FIG. 3, taken along the line 6-6 of FIG. 4.

Referring to FIG. 6, which is a section plane taken near the upper end of housing 45, a depression or wide channel 91 is formed in interior face 85 of each of the first and second housing members 45a, 45b. Depression 91 in first housing member 45a mates with depression 91 in second housing member 45b to define an oblong opening 93. Opening 93 is sized to receive and grip armor 49 of motor lead 31.

Referring again to FIG. 4, each depression 91 extends downward from the upper end of housing member 45a to an intersection with the three recess upper portions 88a, 88b, 88c. This intersection occurs where the three electrical lines 47 converge into side-by-side contact with each other. Depression 91 extends a distance substantially equal to the length that armor 49 extends into upper housing 45.

Upper housing members 45a, 45b may be clamped around the three electrical lines 47 and secured to lower housing 39 in various manners. In this example, lower housing 39 has an external outward facing groove 95 formed on it a short distance below bosses 71. Each upper housing member 45a, 45b has a mating inward protruding rib 97 that fits within groove 95. The rib and groove arrangement could be reversed. Upper housing members 45a, 45b have fastener holes 99 extending through them for receiving fasteners 101. Fastener hole 99 in upper housing member 45a may be threaded, as shown in FIG. 5. Tightening fasteners 101 draws the interior faces 85 toward each other. When fully tightened, upper housing members 45a, 45b will apply compression to lead tape wraps 83a, 83b, 83c and to the portion of electrical lines 47 between lead tape wraps 83a, 83b, 83c and armor 49. Also, compression will be applied to the portion of armor 49 within oblong hole 93. When fasteners 101 are fully tightened, interior faces 85 of upper housing member 45a, 45b may contact each other, or a slight clearance could exist.

To assemble connector 33 on motor lead 31, a technician will attach terminals 51 to the lower ends of electrical lines 47 and pass each through one of the lower housing passages 73 through insulator block 53, seal block 55 and into lower housing insulator block 57. He will then wrap lead tape around bosses 71, forming lead tape wraps 83a, 83b, 83c. He will place one of the upper housing members 45a, 45b on one side of electrical lines 47 and engage rib 97 with groove 95. He will position lead tape wraps 83a, 83b, 83c in the open recesses 87a, 87b, 87c and a portion of electrical lines 47 in the recess upper portions 88a, 88b, 88c. He positions armor 49 in depression 91. The technician will then place the other upper housing member 45a, 45b on the opposite side with interior faces 85 facing each other, and its rib 97 engaging groove 95. The technician then clamps upper housing members 45a, 45b together with fasteners 101. Upper housing members 45a, 45b do not form a seal around armor 49 but provide restraint. It is not necessary to fill the clamped upper housing members 45a, 45b with epoxy.

The present invention described herein, therefore, is well adapted to carry out the objects and attain the ends and advantages mentioned, as well as others inherent therein. While only a few embodiments of the invention have been given for purposes of disclosure, numerous changes exist in the details of procedures for accomplishing the desired results. For example, the upper housing could be formed in one piece and connected to the lower housing by a threaded engagement. These and other similar modifications will readily suggest themselves to those skilled in the art, and are intended to be encompassed within the spirit of the present invention disclosed herein and the scope of the appended claims.

The invention claimed is:

1. An electrical connector for downhole well equipment, comprising:
   a lower housing;
   the lower housing having a plurality of upward protruding bosses, the bosses having axes parallel with each other that are located in a single plane, each of the bosses having an annular external side wall;
   a plurality of passages within the lower housing, each extending through one of the bosses;
   a plurality of electrical lines, each of the electrical lines extending through one of the passages;
   a plurality of isolation boots, each extending around the external side wall of one of the bosses and a portion of one of the electrical lines, each of the isolation boots sealing one of the electrical lines to one of the bosses;
   an upper housing secured to the lower housing, the upper housing having an interior containing the isolation boots; and wherein the upper housing comprises:
   first and second members that clamp around the electrical lines, each of the first and second members having a plurality of recesses, the recesses of the first member mating with the recesses of the second member to define cavities within the interior of the upper housing, each of the cavities receiving one of the isolation boots.

2. The connector according to claim 1, further comprising:
   a groove and rib arrangement on lower ends of the first and second members and along an upper end of the lower housing to connect the first and second members to the lower housing.

3. The connector according to claim 1, further comprising:
   a metal armor strip wrapped around the plurality of electric lines; and
   an oblong upper opening defined by mating depressions in the first and second members, upper opening being clamped around and in frictional engagement with the armor strip.

4. The connector according to claim 3, wherein:
each of the first and second members has an interior face, the interior faces facing each other when the first and second members are clamped together;
the recesses of the first member being formed in the interior face of the first member, and the recesses of the second member being formed in the interior face of the second member; and
each of the recesses of the first and second members is semi-circular when viewed in a transverse cross-section perpendicular to the axes of the bosses.

5. The connector according to claim 1, wherein:
each of the isolation boots comprises a tape wrapped around one of the bosses.

6. The connector according to claim 1, further comprising:
a lead sheath on each of the electrical lines; and wherein
each of the isolation boots comprises a lead tape wrapped around one of the bosses and a portion of one of the lead sheaths.

7. An electrical connector for a submersible well pump motor, comprising:
a lower housing having a lower end for abutment with and securing to the motor;
a plurality of bosses protruding upward from and defining an upper end of the lower housing, each of the bosses having an annular external side wall, the external side walls being spaced apart from each other;
a plurality of passages within the lower housing, each extending through one of the bosses;
a plurality of electrical lines, each extending through one of the passages, each of the electrical lines comprising a lead sheath surrounding an insulation layer, which surrounds an electrical conductor;
an electrical terminal on a lower end of each of the conductors, the terminals being within the lower housing below the bosses for connection with motor wires extending upward from the motor;
a plurality of lead tape wraps, each wrapped around the external side wall of one of the bosses and a portion of the lead sheath of one of the electrical lines, each of the lead tape wraps sealing one of the electrical lines to one of the bosses;
an upper housing having first and second members that fit on opposite sides of the electrical lines, the first and second members having lower ends that connect to the lower housing, each of the first and second members having a plurality of recesses, the recesses of the first member mating with the recesses of the second member to define cavities, each of the cavities closely receiving one of the lead tape wraps; and
a fastener that clamps the first and second members of the upper housing together.

8. The connector according to claim 7, further comprising:
a groove extending along an exterior surface of the lower housing; and
a rib on the lower end of each of the first and second members that engages the groove.

9. The connector according to claim 7, further comprising:
a plurality of ridges on of each of the first and second members, each of the ridges on one of the first and second members being on an opposite side from one of the ridges on the other of the first and second members, the ridges being within spaces between adjacent ones of the lead tape wraps.

10. The connector according to claim 7, wherein:
each of the first and second members has an interior face, the interior faces facing each other when the first and second members are clamped together;
the recesses of the first member being formed in the interior face of the first member, and the recesses of the second member being formed in the interior face of the second member; and
each of the recesses of the first and second members is semi-circular when viewed in a transverse cross-section perpendicular to the axes of the bosses.

11. The connector according to claim 7, further comprising:
a metal armor strip wrapped around the plurality of electric lines; and
an oblong upper opening defined by the first and second members of the upper housing that clamps around and frictionally engages the armor strip when the first and second members are clamped together.

12. The connector according to claim 7, wherein:
each of the first and second members has an interior face, the interior faces facing each other when the first and second members are clamped together;
the interior face of the first member having a first member upper depression leading from an upper end of the first member downward to the recesses in the first member;
the interior face of the second member having a second member upper depression leading from an upper end of the second member downward to the recesses in the second member; and
the first member upper depression and the second member upper depression mate to define the upper opening.

13. The connector according to claim 7, wherein the external side wall of each of the bosses is conical.

14. A submersible well pump assembly, comprising:
a pump;
an electrical motor operatively coupled to the pump for driving the pump, the motor having a head on an upper end;
a motor lead extending alongside the pump, the motor lead having three electrical lines arranged side-by-side and wrapped with a metal armor strip, each of the electrical lines being encased in a lead sheath;
a connector on a lower end of the power lead, comprising:
a lower housing secured to the head of the motor;
the lower housing having three upward protruding bosses, the bosses having axes parallel with each other and located in a single plane, each of the bosses having an annular external side wall, the external side walls being laterally spaced apart from each other;
a passage extending through each of the bosses, each of the electrical lines extending through one of the passages;
an electrical terminal on a lower end of each of the electrical lines that is connected to a motor wire leading from the motor, the electrical terminals being below the bosses;
a plurality of lead tape wraps, each wrapped around the external side wall of one of the bosses and a portion of the lead sheath of one of the electrical lines, each of the lead tape wraps sealing one of the electrical lines to one of the bosses;
an upper housing having first and second members that clamp around the three electrical lines, each of the first and second members having an interior surface, the interior surfaces facing each other when clamped around the three electrical lines;

three side-by-side recesses in the interior surface of each of the first and second members, the recesses of the first member mating with the recesses of the second member to define three cavities, each of the cavities receiving one of the lead tape wraps;

the interior surface of the first member having a first member upper depression leading from an upper end of the first member downward to the recesses in the first member;

the interior surface of the second member having a second member upper depression leading from an upper end of the second member downward to the recesses in the second member;

the first member upper depression and the second member upper depression mating when the first and second members are clamped to each other to define an oblong upper opening that receives and frictionally engages the armor strip;

a rib and groove arrangement on the first and second members and on the lower housing that connects the first and second members to the lower housing; and a fastener that clamps the first and second members of the upper housing together.

15. The assembly according to claim 14, wherein:
a lower portion of each of the cavities defined by the recesses conforms to and is in contact with an entire exterior surface of one of the lead tape wraps; and
an upper portion of each of the cavities defined by the recesses conforms to and is in contact with an entire exterior surface of one of the electrical lines between the lead tape wraps and the armor strip.

16. The assembly according to claim 14, wherein:
each of the recesses of the first and second members is semi-circular when viewed in a transverse cross-section perpendicular to the axes of the bosses.

17. The assembly according to claim 14, wherein:
the lower housing has an internal downward facing wall below the bosses, defining an insulator chamber in which the terminals are located; and
the passages extend from upper ends of the bosses to the insulator chamber.

18. The assembly according to claim 17, wherein:
the sheaths have lower ends at the downward facing wall.

19. The assembly according to claim 14, wherein:
the external side wall of each of the bosses is conical, having a smaller outer diameter at an upper end than a lower end.

* * * * *

UNITED STATES PATENT AND TRADEMARK OFFICE
CERTIFICATE OF CORRECTION

PATENT NO. : 10,224,669 B1
APPLICATION NO. : 15/834592
DATED : March 5, 2019
INVENTOR(S) : David Tanner Page 1 of 1

It is certified that error appears in the above-identified patent and that said Letters Patent is hereby corrected as shown below:

In the Specification

In Column 4, Line 25, reads: "it is highly cohesive Each of the three lead tape wraps 83a"
It should read: --it is highly cohesive. Each of the three lead tape wraps 83a--;

In the Claims

In Column 6, Line 64, reads: "the first and second members, upper opening being"
It should read: --the first and second members, the upper opening being--; and In Column 7, Line 62, reads: "a plurality of ridges on of each of the first and second"
It should read: --a plurality of ridges on each of the first and second--.

Signed and Sealed this
Tenth Day of November, 2020

Andrei Iancu
*Director of the United States Patent and Trademark Office*